(12) United States Patent
Bugos

(10) Patent No.: US 9,115,624 B2
(45) Date of Patent: Aug. 25, 2015

(54) ANTI-ROTATION STRUCTURE FOR A VALVE INSTALLED IN AN EXHAUST BOSS OF A REDUCTANT DELIVERY SYSTEM

(75) Inventor: Stephen C. Bugos, Poquoson, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1006 days.

(21) Appl. No.: 13/193,832

(22) Filed: Jul. 29, 2011

(65) Prior Publication Data

US 2013/0026402 A1 Jan. 31, 2013

(51) Int. Cl.
*F01N 3/00* (2006.01)
*F01N 3/20* (2006.01)

(52) U.S. Cl.
CPC ............ *F01N 3/2066* (2013.01); *F01N 2610/02* (2013.01); *F01N 2610/1453* (2013.01); *Y02T 10/24* (2013.01); *Y10T 29/49826* (2015.01)

(58) Field of Classification Search
CPC .............. F01N 3/2066; F01N 2610/02; F01N 2610/1453; Y01T 29/49826; Y02T 10/24
USPC ........ 137/454.6; 251/143, 145, 148; 277/630, 277/637; 285/89, 91, 92, 330
See application file for complete search history.

(56) References Cited

U.S. PATENT DOCUMENTS

| | | | | |
|---|---|---|---|---|
| 928,679 | A * | 7/1909 | Bonfield | 192/85.47 |
| 1,226,175 | A * | 5/1917 | Odee | 137/329.1 |
| 1,549,213 | A * | 8/1925 | Payne | 137/234 |
| 1,637,365 | A * | 8/1927 | Wernle | 285/208 |
| 1,770,609 | A * | 7/1930 | Frauenheim | 285/106 |
| 1,812,709 | A * | 6/1931 | Odee et al. | 174/152 S |
| 1,817,505 | A * | 8/1931 | Berthold | 174/152 S |
| 1,988,966 | A * | 1/1935 | Eckhouse | 137/454.6 |
| 2,362,686 | A * | 11/1944 | De Lano | 285/332.3 |
| 2,612,337 | A * | 9/1952 | Maynard | 251/340 |
| 4,290,152 | A * | 9/1981 | Kesselman, Sr. | 4/678 |
| 4,532,958 | A * | 8/1985 | Napolitano | 137/454.2 |
| 4,684,284 | A * | 8/1987 | Bradley, Jr. | 403/320 |
| 4,801,158 | A * | 1/1989 | Gomi | 285/52 |
| 4,936,339 | A * | 6/1990 | Bennett | 137/454.6 |
| 5,145,394 | A * | 9/1992 | Hager | 439/321 |
| 5,803,465 | A * | 9/1998 | Schweiger | 277/593 |
| 6,019,125 | A * | 2/2000 | Reverberi | 137/454.6 |
| 6,705,292 | B2 * | 3/2004 | Bugos | 123/470 |
| 2008/0105841 | A1 * | 5/2008 | Hornby et al. | 251/129.01 |
| 2008/0236147 | A1 * | 10/2008 | Van Vuuren et al. | 60/295 |
| 2009/0107126 | A1 * | 4/2009 | Bugos et al. | 60/301 |

FOREIGN PATENT DOCUMENTS

| | | |
|---|---|---|
| JP | 2004239716 A | 8/2004 |
| WO | 2010088646 A1 | 8/2010 |

OTHER PUBLICATIONS

The International Search Report and the Written Opinion of the International Searching Authority, PCT/US2012/041030.

* cited by examiner

*Primary Examiner* — John K Fristoe, Jr.
*Assistant Examiner* — David Colon Morales

(57) ABSTRACT

A valve structure (20') is provided for insertion into a boss (22'). The boss includes a threaded bore (46) and at least one key slot (48) therein. The valve structure includes a valve (26) constructed and arranged to control fluid flow, a fitting (24) surrounding at least a portion of the valve with the fitting having external threads (28) for mating with the threaded bore, and anti-rotate structure (34) between the valve and the fitting. The anti-rotate structure is constructed arranged such that when the fitting is rotated into threaded engagement with the boss, at least a portion of the anti-rotate structure engages a surface defining the key slot in the boss, thereby preventing rotation of the valve, with the fitting clamping on the anti-rotate structure and thus the valve.

18 Claims, 2 Drawing Sheets

ANTI-ROTATION STRUCTURE FOR A VALVE INSTALLED IN AN EXHAUST BOSS OF A REDUCTANT DELIVERY SYSTEM

FIELD OF THE INVENTION

The invention relates to a reductant delivery system that supplies reductant to an engine exhaust flow path and, more particularly, to an anti-rotate structure that prevents a valve, that delivers the reductant, from rotating when installed in a boss of the exhaust flow path.

BACKGROUND OF THE INVENTION

Federal and state governments have imposed increasingly strict regulations over the years governing the levels of hydrocarbon (HC), carbon monoxide (CO) and nitrogen oxide (NOx) pollutants that a motor vehicle may emit to the atmosphere.

In diesel engine systems, a diesel particulate filter (DPF) is provided to trap the particulate matter in the exhaust passage of the diesel engine. Conventionally, a dosing valve is mounted into the exhaust manifold of a diesel system to inject diesel fuel as the reductant into the exhaust to reduce the particulate matter and thus reduce NOx emissions. With reference to FIG. 1, a conventional reductant delivery system is shown, generally indicated at 10. The system 10 includes a control valve 12 having an inlet 14 and an outlet 16. The inlet 14 receives reductant such as diesel fuel from a tank (not shown). The fuel outlet 16 is connected to one end of the extension tube 18, with the other end of the extension tube 18 being connected to a dosing valve structure, generally indicated at 20. The dosing valve structure 20 is coupled to an exhaust boss 22 that communicates with the vehicle exhaust.

With reference to FIG. 2, the dosing valve includes a boss fitting 24 that surrounds a portion of a valve 26, inserted into the boss fitting 24. The boss fitting 24 has external threads 28 that engage internal threads in the exhaust boss 22. When the dosing valve structure 20 is coupled to the exhaust boss 22 to compress down on the valve 26, the end 30 of the boss fitting 24 comes into contact with the upper face 32 of a housing of the valve 26. As the boss fitting 24 is rotated to achieve threaded engagement with the exhaust boss 22, the valve 26 can rotate and thus disrupt the orientation of the control valve 12.

Thus, there is also a need to provide anti-rotate structure to prevent the valve 26 from rotating when the dosing valve structure 20 is coupled to the exhaust boss 22.

SUMMARY OF THE INVENTION

An object of the invention is to fulfill the needs referred to above. In accordance with the principles of the present invention, this objective is obtained by providing a valve structure for insertion into a boss. The boss includes a threaded bore and at least one key slot therein. The valve structure includes a valve constructed and arranged to control fluid flow, a fitting surrounding at least a portion of the valve with the fitting having external threads for mating with the threaded bore, and anti-rotate structure between the valve and the fitting. The anti-rotate structure is constructed arranged such that when the fitting is rotated into threaded engagement with the boss, at least a portion of the anti-rotate structure engages a surface defining the key slot in the boss, thereby preventing rotation of the valve, with the fitting clamping on the anti-rotate structure and thus the valve.

In accordance with another aspect of a disclosed embodiment, a method prevents rotation of a valve with respect to an exhaust boss in a reductant delivery system. The method provides the exhaust boss to have a threaded bore and at least one key slot therein. A dosing valve structure has a valve and a fitting surrounding at least a portion of the valve with the fitting having external threads for mating with the threaded bore. Anti-rotate structure is provided between the valve and the fitting. The method ensures that when the fitting is rotated into threaded engagement with the exhaust boss, at least a portion of the anti-rotate structure engages a surface defining the key slot in the exhaust boss, thereby preventing rotation of the valve, with the fitting clamping on the anti-rotate structure and thus the valve.

In accordance with yet another aspect of a disclosed embodiment, a method prevents rotation of a valve with respect to an exhaust boss in a reductant delivery system. The method provides the exhaust boss to have a threaded bore. A dosing valve structure has a valve and a fitting surrounding at least a portion of the valve with the fitting having external threads for mating with the threaded bore for clamping the valve into the exhaust bore. The method prevents the valve from rotating with the fitting when the fitting is rotated into threaded engagement with the exhaust boss.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
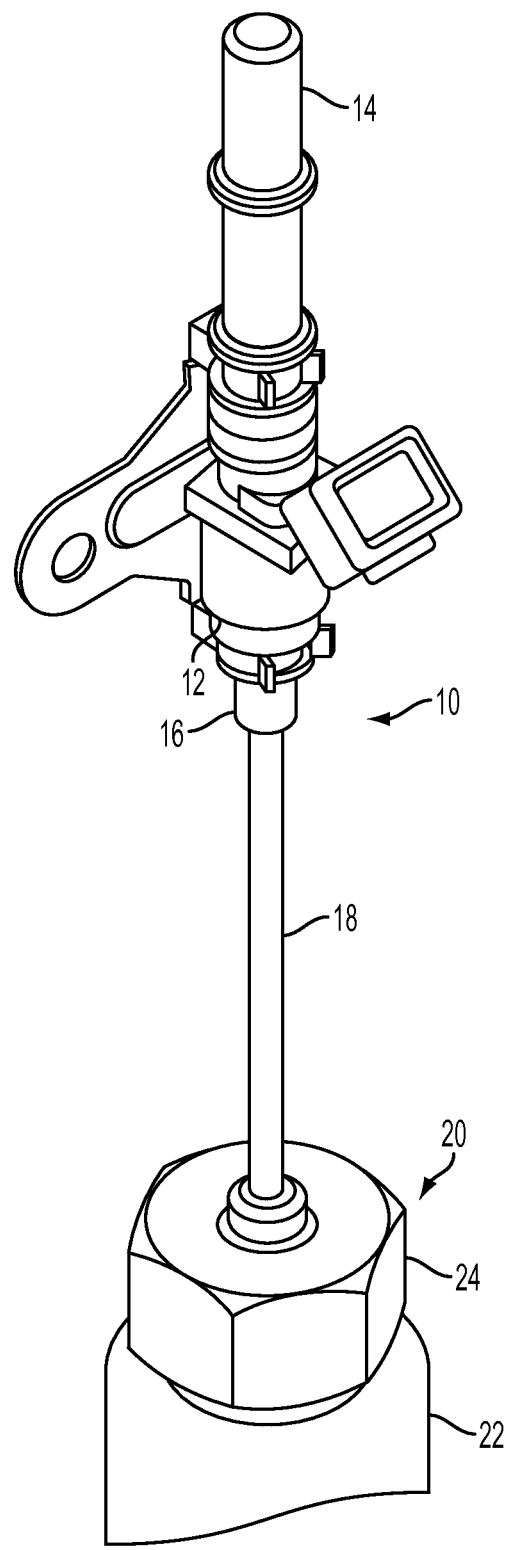
FIG. 1 is a view of a conventional reductant delivery system.
Figure 2:
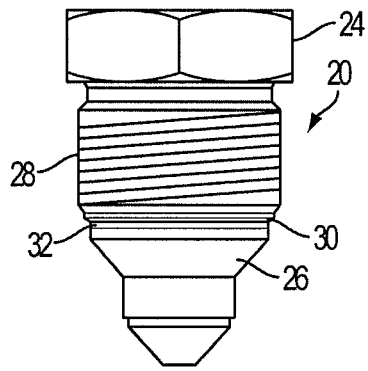
FIG. 2 is a view of the dosing valve structure of FIG. 1.
Figure 3:
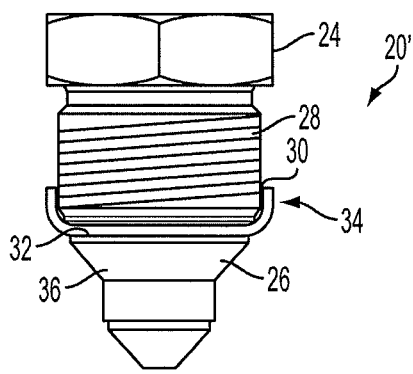
FIG. 3 is a view anti-rotate structure provided between a boss fitting and a valve of dosing valve structure, in accordance with an embodiment of the present invention.

With reference to FIG. 3, a dosing valve structure is shown, generally indicated at 20', in accordance with an embodiment of the invention. The dosing valve structure 20' is for use in a reductant delivery system of the type shown in FIG. 1 and includes anti-rotate structure, generally indicated at 34, disposed between the end 30 of the boss fitting 24 and the upper face 32 of the housing 36 of the valve 26. The valve 26 is preferably a conventional poppet valve constructed and arranged to be fluid pressure operated to permit reductant to be injected into a vehicle's exhaust flow path.

Figure 4:
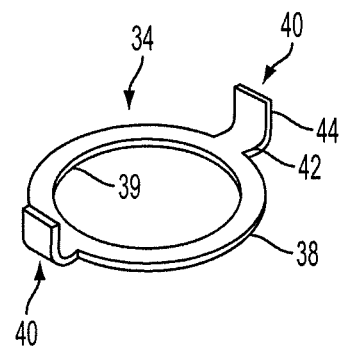
FIG. 4 is a view of the anti-rotate structure of FIG. 3.

As shown in FIG. 4, the anti-rotate structure 34 incudes a generally annular washer body 38 having at least one finger, generally indicated at 40, extending outwardly from the washer body 38 in a cantilever manner. The washer body 38 has a bore 39 there-through for receiving a portion of the valve 26 therein. In the embodiment, a pair of fingers 40 is provided, 180 degrees apart, but fewer or more fingers 40 can be provided.

As shown, preferably each finger 40 has a first portion 42 coupled to periphery of the washer body 38 and a second portion 44 bent so as to be generally transverse with respect to the first portion 42 and disposed outside the bounds of the threads 28 of the boss fitting 24 (FIG. 3).

Figure 5:
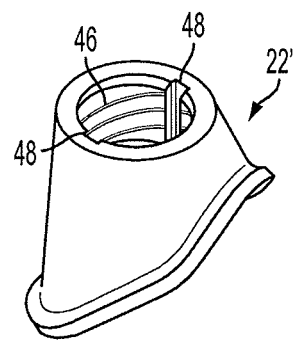
FIG. 5 is view of the exhaust boss having key slots for receiving the anti-rotate structure of FIG. 4.
Figure 6:
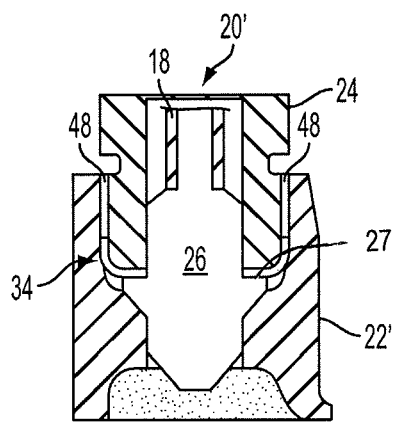
FIG. 6 is a sectional view showing the dosing valve structure of FIG. 3 with anti-rotate structure, received in the exhaust boss of FIG. 5.

With reference to FIG. 5, the exhaust boss 22' includes a threaded bore 46 for receiving the threads 28 of the boss fitting 24. The bore 46 communicates with a vehicle's exhaust flow path. In order to accommodate the fingers 40 of the anti-rotate structure 35, a key slot 48 is provided in the exhaust boss 22' for each finger 40 provided. Thus, with reference to FIG. 6, when installing the dosing valve structure 20' into the exhaust boss 22', the installer aligns and inserts the fingers 40 with the key slots 48 and then threads the boss fitting 24 into the exhaust boss 22'. The fingers 40 engage the surfaces defining key slots 48 and thus, the anti-rotate structure 34 is unable to rotate. However, the anti-rotate structure 34 compresses down on the integral annular flange 27 of valve 26 (which also cannot rotate since it is isolated from the boss fitting 24), which in turn, compresses down into its sealing position.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A valve structure for insertion into a boss, the boss including a threaded bore and at least one key slot therein, the valve structure comprising:
    a valve constructed and arranged to control fluid flow, the valve having an integral annular flange,
    a fitting surrounding at least a portion of the valve, the fitting having external threads for mating with the threaded bore, and
    an anti-rotate structure separate from the valve and the fitting and disposed between the valve and the fitting, the anti-rotate structure being constructed and arranged such that when the fitting is rotated into threaded engagement with the boss, at least a portion of the anti-rotate structure engages a surface defining the key slot in the boss, thereby preventing rotation of the valve, with the fitting clamping on the anti-rotate structure and the anti-rotate structure clamping on the annular flange of the valve,
    wherein the anti-rotate structure comprises:
    a washer body having an inner edge defining a bore through the washer body, the inner edge having an inner edge height, the bore being configured to receive a portion of the valve therein, and
    at least one finger extending from a periphery of the washer body and defining the portion that engages the surface defining the key slot of the boss, the finger having a finger height, wherein the finger height is greater than the inner edge height.

2. The valve structure of claim 1, wherein a pair of fingers extend from the washer body about 180 degrees apart.

3. The valve structure of claim 1, wherein the at least one finger has a first portion coupled to the periphery of the washer body and a second portion bent so as to be generally transverse with respect to the first portion.

4. The valve structure of claim 3, wherein the second portion is disposed outside bounds of the external threads of the boss fitting.

5. The valve structure of claim 1, in combination with the boss, the boss being in communication with a vehicle's exhaust flow path.

6. The combination of claim 5, the anti-rotate structure includes at least one finger constructed and arranged to be received in the at least one key slot.

7. A method of preventing rotation of a valve with respect to an exhaust boss in a reductant delivery system, the method comprising:
    providing the exhaust boss to have a threaded bore and at least one key slot therein,
    providing a dosing valve structure having a valve and a fitting surrounding at least a portion of the valve, the fitting having external threads for mating with the threaded bore, the valve having an integral annular flange,
    providing anti-rotate structure separate from the valve and the fitting and disposed between the valve and the fitting, including providing the anti-rotate structure to define an inner edge and an outer finger, the outer finger having a greater height than the inner edge, and
    ensuing that when the fitting is rotated into threaded engagement with the exhaust boss, at least a portion of the anti-rotate structure engages a surface defining the key slot in the exhaust boss, thereby preventing rotation of the valve, with the fitting clamping on the anti-rotate structure and the anti-rotate structure clamping on the annular flange of the valve.

8. The method of claim 7, wherein step of providing the anti-rotate structure provides:
    a washer body having a bore there-through for receiving a portion of the valve therein, and
    at least one finger extending from a periphery of the washer body and defining the portion that engages the surface defining the key slot of the exhaust boss.

9. The method claim 8, wherein a pair of fingers extends from the washer body about 180 degrees apart.

10. The method of claim 8, wherein the at least one finger has a first portion coupled to the periphery of the washer body and a second portion bent so as to be generally transverse with respect to the first portion.

11. The method of claim 10, wherein the second portion is disposed outside bounds of the external threads of the boss fitting.

12. The method of claim 7, wherein the portion of the anti-rotate structure that engages the key slot is a finger extending from a body of the anti-rotate structure.

13. A method of preventing rotation of a valve with respect to an exhaust boss in a reductant delivery system, the method comprising:
    providing the exhaust boss to have a threaded bore in communication with a vehicle's exhaust flow path,
    providing a dosing valve structure having a valve and a fitting surrounding at least a portion of the valve, the fitting having an inner edge and an outer finger, the outer finger having a greater height than the inner edge, the fitting having external threads for mating with the threaded bore for clamping the valve into the exhaust bore, the dosing valve structure being constructed and arranged to deliver reductant into the exhaust flow path, and preventing the valve from rotating with the fitting when the fitting is rotated into threaded engagement with the exhaust boss.

14. The method of claim 13, wherein the exhaust boss has at least one key slot therein and wherein the preventing step includes engaging at least a portion of an anti-rotate structure separate from the valve and the fitting and provided between the fitting and the valve, with a surface defining the key slot in the exhaust boss, thereby preventing rotation of the valve.

15. The method of claim 14, wherein the anti-rotate structure comprises:
   a washer body having a bore there-through for receiving a portion of the valve therein, and
   at least one finger extending from a periphery of the washer body and defining the portion that engages the surface defining key slot of the exhaust boss.

16. The method claim 15, wherein a pair of fingers extends from the washer body about 180 degrees apart.

17. The method of claim 15, wherein the at least one finger has a first portion coupled to the periphery of the washer body and a second portion bent so as to be generally transverse with respect to the first portion.

18. The method of claim 17, wherein the second portion is disposed outside bounds of the external threads of the boss fitting.

* * * * *